(12) United States Patent
Kuehnert et al.

(10) Patent No.: US 12,596,979 B2
(45) Date of Patent: Apr. 7, 2026

(54) PERSONALIZED RISK AND REWARD CRITERIA FOR WORKFORCE MANAGEMENT

(71) Applicant: INTERNATIONAL BUSINESS MACHINES CORPORATION, Armonk, NY (US)

(72) Inventors: Julian Bertram Kuehnert, Nairobi (KE); Sekou Lionel Remy, Nairobi (KE); Aisha Walcott, Nairobi (KE); Catherine H. Crawford, Bedford, NH (US)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 17/934,602

(22) Filed: Sep. 23, 2022

(65) Prior Publication Data

US 2024/0104471 A1     Mar. 28, 2024

(51) Int. Cl.
*G06Q 10/0635* (2023.01)
*G06Q 10/1093* (2023.01)

(52) U.S. Cl.
CPC ..... *G06Q 10/0635* (2013.01); *G06Q 10/1093* (2013.01)

(58) Field of Classification Search
CPC ...................... G06Q 10/0635; G06Q 10/1093
See application file for complete search history.

(56) References Cited

U.S. PATENT DOCUMENTS

| | | | | |
|---|---|---|---|---|
| 6,574,605 | B1 * | 6/2003 | Sanders | G06Q 10/1097 379/265.06 |
| 6,889,196 | B1 * | 5/2005 | Clark | G06Q 10/0635 705/7.38 |
| 10,606,584 | B2 | 3/2020 | Rao | |
| 10,956,213 | B1 | 3/2021 | Chambers | |
| 11,138,567 | B1 * | 10/2021 | Schmoldt | G06Q 10/06393 |
| 11,144,856 | B1 | 10/2021 | Bagade | |
| 11,164,112 | B2 | 11/2021 | Tamano | |

(Continued)

FOREIGN PATENT DOCUMENTS

| | | | |
|---|---|---|---|
| CN | 112396257 A | | 2/2021 |
| CN | 120297896 A | * | 7/2025 |
| WO | 2000068854 A2 | | 11/2000 |

OTHER PUBLICATIONS

Zupancic et al. "Predicting Employee Absence from Historical Absence Profiles with Machine Learning" (2024) (https://www.mdpi.com/2076-3417/14/16/7037) (Year: 2024).*

(Continued)

*Primary Examiner* — Sujay Koneru
(74) *Attorney, Agent, or Firm* — Elliot J. Shine

(57) ABSTRACT

A method, computer system, and a computer program product for integrating uncertainty quantifications into a long-term risk based calendar is provided. The present invention may include receiving data for an organization. The present invention may include generating a long-term risk based calendar using the data received for the organization. The present invention may include presenting the long-term risk based calendar to a plurality of user associated with the organization. The present invention may include providing one or more recommendations to at least one of the plurality of users.

14 Claims, 2 Drawing Sheets

(56) References Cited

U.S. PATENT DOCUMENTS

| | | | | |
|---|---|---|---|---|
| 11,516,036 | B1* | 11/2022 | Harathi | H04L 12/1822 |
| 2005/0288987 | A1* | 12/2005 | Sattler | G06Q 10/1093 |
| | | | | 705/7.18 |
| 2007/0143156 | A1 | 6/2007 | Van Deursen | |
| 2008/0300953 | A1* | 12/2008 | Sarlay | G06Q 10/063112 |
| | | | | 705/7.14 |
| 2010/0023384 | A1 | 1/2010 | Pollard | |
| 2011/0119101 | A1 | 5/2011 | Drury | |
| 2011/0145032 | A1 | 6/2011 | Stearns | |
| 2012/0221948 | A1* | 8/2012 | Zhang | G06F 16/5866 |
| | | | | 715/273 |
| 2015/0073841 | A1 | 3/2015 | Gray | |
| 2015/0170106 | A1 | 6/2015 | Carenza | |
| 2015/0242793 | A1 | 8/2015 | Williams | |
| 2016/0098653 | A1* | 4/2016 | Hojby | G06Q 10/0635 |
| | | | | 705/7.28 |
| 2017/0262813 | A1* | 9/2017 | Steffeney | G06Q 30/018 |
| 2018/0107965 | A1* | 4/2018 | Namboothiri | G06Q 10/063116 |
| 2020/0349494 | A1 | 11/2020 | Martin | |
| 2021/0056860 | A1* | 2/2021 | Fahrendorff | G06Q 10/10 |
| 2021/0279687 | A1* | 9/2021 | Shimura | G06Q 10/06398 |
| 2022/0222608 | A1* | 7/2022 | Lee | G06Q 10/063118 |
| 2022/0300909 | A1* | 9/2022 | Kinai | G06Q 10/1093 |
| 2023/0005605 | A1* | 1/2023 | Tellis | G06Q 10/067 |
| 2024/0378532 | A1* | 11/2024 | Salim | G06Q 10/0635 |

OTHER PUBLICATIONS

Disclosed Anonymously, "Automated Calculation of Risk Analysis for Weather Events for Workflow Management Project Plans", https://priorart.ip.com/IPCOM/000265128, IPCOM000265128D, Mar. 1, 2021, pp. 1-5.
Disclosed Anonymously, "System and Method for Identification of External Risks and Mitigation Approach in a Project", IPCOM000268318D, https://priorart.ip.com/IPCOM/000268318, Jan. 24, 2022, pp. 1-6.
Gargate, "Weather Data Gamification", Submitted to the Office of Graduate Studies of Texas A&M University, https://oaktrust.library.tamu.edu/bitstream/handle/1969.1/151174/GARGATE-THESIS-2013.pdf?sequence=1, Thesis, Major Subject: Computer Science, Aug. 2013, pp. 1-93.
Jägare, "Workforce Management AI-Based Forecasting for Dummies®", https://www.crmxchange.com/uploadedFiles/Featured_White_Papers/PDF/workforce_management_AI_forecasting_for_dummies.pdf, NICE Special Edition, Published by: John Wiley & Sons, Ltd., The Atrium, © 2020, pp. 1-61.
Kinai, et al., "Spatio-Temporal Calendar Generation", Application and Drawings, Filed Mar. 16, 2021, pp. 51, U.S. Appl. No. 17/203,585.
Nag et al., "Evaluating Erlang C and Erlang A Models for Staff Optimization: A Case Study in an Airline Call Center", https://ieeexplore.ieee.org/document/8289839, 2017 IEEE International Conference on Industrial Engineering and Engineering Management (IEEM), Accessed on Sep. 1, 2022, pp. 1-5.
Poulhes et al., "Modeling skier behavior for planning and management. Dynaski, an agent-based in congested ski-areas", https://arxiv.org/ftp/arxiv/papers/2011/2011.11976.pdf, Nov. 24, 2020, pp. 1-25.
Talamadupula et al., "Planning for Human-Robot Teaming in Open Worlds", http://doi.acm.org/10.1145/1869397.1869403, ACM Transactions on Intelligent Systems and Technology, vol. 1, No. 2, Article 14, Pub. date: Nov. 2010. pp. 24.

\* cited by examiner

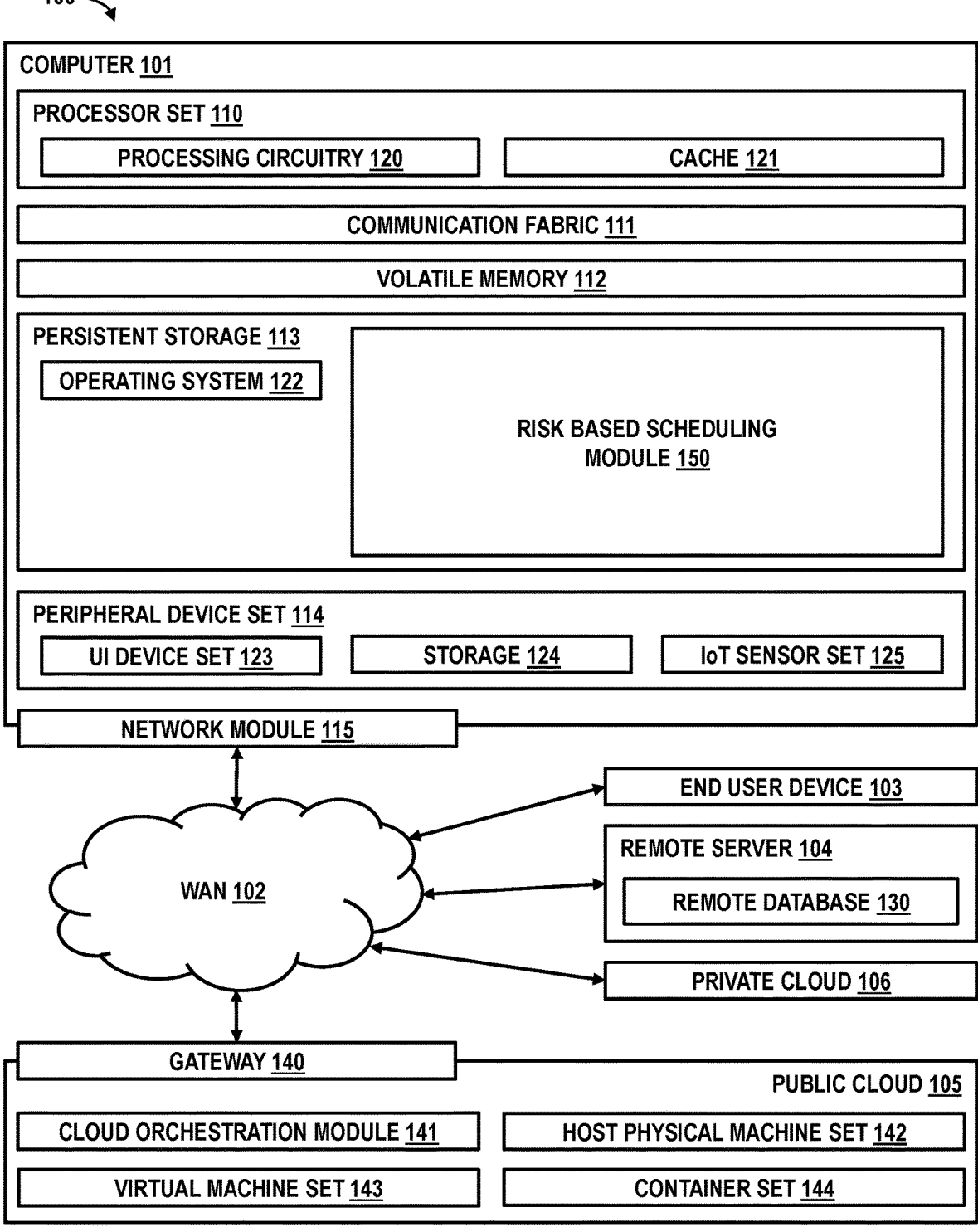

100

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

RISK BASED SCHEDULING
MODULE 150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

START

RECEIVE DATA FOR AN ORGANIZATION 202

GENERATE A LONG-TERM RISK BASED CALENDAR 204

PRESENT THE LONG-TERM RISK BASED CALENDAR TO A PLURALITY OF USERS 206

PROVIDE ONE OR MORE RECOMMENDATIONS 208

RECEIVE FEEDBACK 210

PERSONALIZED RISK AND REWARD CRITERIA FOR WORKFORCE MANAGEMENT

BACKGROUND

The present invention relates generally to the field of computing, and more particularly to workforce management.

Planning vacations, workplace leave, business trips, events, and/or other forms of leave planning can be difficult due to uncertain events, such as, but not limited to, historical weather events, seasonal infectious diseases, traveling factors, amongst other uncertain events. Additionally, it may difficult coordinating leave planning with an organization. Depending on an organization advance leave planning may be essential in avoiding short-staffing, over-staffing, amongst other factors which may affect an organization. Accordingly, providing a gamification system that leverages data of uncertain events which may directly impact an organization may enable users to plan vacations, workplace leave, business trips, events, and/or other forms of leave, which may reduce the impact on the organization. Current systems fail to consider the uncertainties of long-term events and do not offer a viable gamification feature for advanced leave planning.

Therefore, a logical means for linking uncertainty in weather forecasts and/or other uncertain events with incentives for users in long-term vacation planning is necessary to address the shortfalls of current leave planning systems.

SUMMARY

Embodiments of the present invention disclose a method, computer system, and a computer program product for integrating uncertainty quantifications into a long-term risk based calendar. The present invention may include receiving data for an organization. The present invention may include generating a long-term risk based calendar using the data received for the organization. The present invention may include presenting the long-term risk based calendar to a plurality of user associated with the organization. The present invention may include providing one or more recommendations to at least one of the plurality of users.

In another embodiment, the method may include embedding one or more uncertainty quantifications into the long-term risk based calendar by quantifying probabilities of uncertain events based on a physical location of the organization. Accordingly, the present invention may improve at least the utilization of long-term risk based calendaring within an organization by quantifying probabilistic data for uncertain events and integrating those uncertainty quantifications into a long-term risk based calendar.

In another embodiment, the method may include an integration of a game board to the long-term risk based calendar which may include game rules or incentives designed in conjunction with workplace requirements of an organization. Accordingly, the present invention may improve vacation and/or leave planning by allowing users to participate in a gamification environment tied to a long-term risk based calendar which may allow the users to understand the dynamics of rewards associated with specific dates and/or time periods.

In a further embodiment, the method may include providing the one or more recommendations using one or more prediction algorithms, wherein the one or more prediction algorithms utilizes at least one or more of, organizational requirements, user preferences, or game rules in providing the one or more recommendations. Accordingly, the present invention may improve at least improve over-staffing and/or under-staffing by utilizing one or more prediction algorithms to determine the probabilities of over-staffing and/or under-staffing based on a range of inputs including organizational requirements and job roles.

In addition to a method, additional embodiments are directed to a computer system and a computer program product for leveraging and quantifying probabilistic data for uncertain events and integrating those uncertainty quantifications into a long-term risk based calendar.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 depicts a block diagram of an exemplary computing environment according to at least one embodiment.

DETAILED DESCRIPTION

Figure 2:
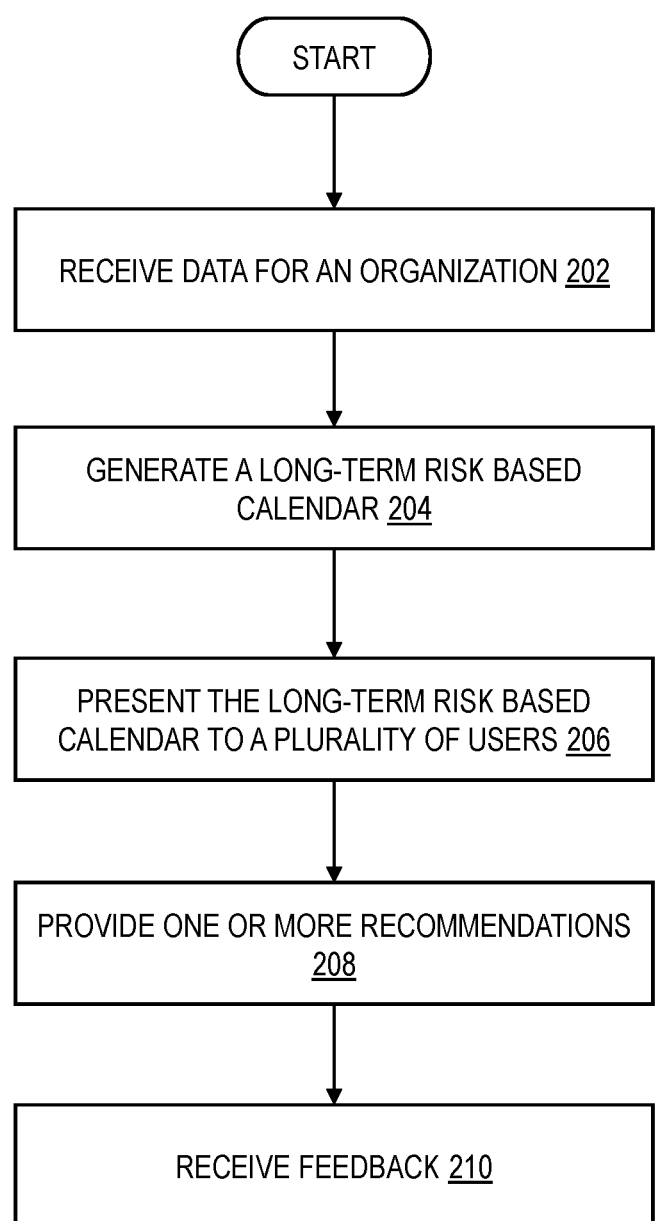
FIG. 2 is an operational flowchart illustrating a process for risk based scheduling according to at least one embodiment.

The following described exemplary embodiments provide a system, method and program product for risk based scheduling. As such, the present embodiment has the capacity to improve the technical field of risk based scheduling and risk quantification by integrating uncertainty quantifications into a long-term risk based calendar. More specifically, the present invention may include receiving data for an organization. The present invention may include generating a long-term risk based calendar using the data received for the organization. The present invention may include presenting the long-term risk based calendar to a plurality of user associated with the organization. The present invention may include providing one or more recommendations to at least one of the plurality of users.

As described previously, planning vacations, workplace leave, business trips, events, and/or other forms of leave planning can be difficult due to uncertain events, such as, but not limited to, historical weather events, seasonal infectious diseases, traveling factors, amongst other uncertain events. Additionally, it may difficult coordinating leave planning with an organization. Depending on an organization advance leave planning may be essential in avoiding short-staffing, over-staffing, amongst other factors which may affect an organization. Accordingly, providing a gamification system that leverages data of uncertain events which may directly impact an organization may enable users to plan vacations, workplace leave, business trips, events, and/or other forms of leave, which may reduce the impact on the organization.

Current systems fail to consider the uncertainties of long-term events and do not offer a viable gamification feature for advanced leave planning.

Therefore, a logical means for linking uncertainty in weather forecasts and/or other uncertain events with incentives for users in long-term vacation planning is necessary to address the shortfalls of current leave planning systems.

Therefore, it may be advantageous to, among other things, receive data for an organization, generate a long-term risk based calendar using the data received for the organization, present the long-term risk based calendar to a plurality of users associated with the organization, and provide one or more recommendations to at least one of the plurality of users.

According to at least one embodiment, the present invention may improve vacation and/or leave planning by quantifying probabilistic data for uncertain events and integrating those uncertainty quantifications into a long-term risk based calendar.

According to at least one embodiment, the present invention may improve vacation and/or leave planning receiving data for the organization, such as, but not limited to, organizational directories, management chains, job descriptions, employee titles, internal documentation, benefit packages associated with employees, a hierarchal organizational structure, remote positions, hybrid positions, vacation policies, leave policies, required time at the physical location, locations of one or more physical locations, calendar data, existing workforce management software, attendance records, IoT (Internet of Things) device data associated with the one or more physical locations, staffing data for previous years, amongst other data which may be provided by the organization.

According to at least one embodiment, the present invention may improve short staffing, over staffing, budgeting, employee satisfaction by providing a gamification system that leverages data of uncertain events which may directly impact the business may enable employees to plan vacations, time off, and/or other workplace leaves, which may reduce the impact on the organization.

According to at least one embodiment, the present invention may improve over-staffing and/or under-staffing by utilizing one or more prediction algorithms to determine the probabilities of over-staffing and/or under-staffing based on a range of inputs including organizational requirements and job roles.

According to at least one embodiment, the present invention may improve vacation and/or leave planning by allowing users to participate in a gamification environment tied to a long-term risk based calendar which may allow the users to understand the dynamics of rewards associated with specific dates and/or time periods. This may lead to a higher motivation amongst users to plan in advance and/or increased incentives provided by an organization more generally.

According to at least one embodiment, the present invention may improve long-term risk based calendaring by utilizing multiple models together to consider exorbitant amounts of data and generate specific long-term risk based calendars for each of a plurality of users. Additionally, employing multiple models may enable specific recommendations and/or incentives/rewards within the gamification system enabled by the invention. The invention may utilize at least, one or more of, linguistic analysis techniques, statistical methodologies, neural networks using prediction algorithms, and/or Deep Neural Networks (DNNs) with reinforcement learning capabilities.

Referring to FIG. 1, Computing environment 100 contains an example of an environment for the execution of at least some of the computer code involved in performing the inventive methods, such as leveraging and quantifying probabilistic data for uncertain events and integrating those uncertainty quantifications into a long-term risk based calendar using the risk based scheduling module 150. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the computer environment 100 may use the risk based scheduling module 150 to provide a gamification system that integrates uncertainty quantifications into a long-term risk based calendar. The risk based scheduling method is explained in more detail below with respect to FIG. 2.

Referring now to FIG. 2, an operational flowchart illustrating the exemplary risk based scheduling process 200 used by the risk based scheduling module 150 according to at least one embodiment is depicted.

At 202, the risk based scheduling module 150 receives data for an organization. The organization may be a business entity, a non-profit organization, an educational institution, or any other organization comprised of a plurality of users (e.g., employees, volunteers, students) in which users may be required to come in to and/or attend a physical location.

The risk based scheduling module 150 may receive data for the organization, such as, but not limited to, organizational directories, management chains, job descriptions, employee titles, internal documentation, benefit packages associated with employees, a hierarchal organizational structure, remote positions, hybrid positions, vacation policies, leave policies, required time at the physical location, locations of one or more physical locations, calendar data, existing workforce management software, attendance records, IoT (Internet of Things) device data associated with the one or more physical locations, staffing data for previous years, amongst other data which may be provided by the organization. The risk based scheduling module 150 may only receive and/or access the data described above after receiving consent from the plurality of users and/or the organization.

The risk based scheduling module 150 may utilize the data described above in understanding requirements for one or more physical locations. The requirements for the one or more physical locations may include, but are not limited to including, number of staff present at each physical location, specific job roles required at each physical location, number of employees required to be on-call, amongst other requirements. The risk based scheduling module 150 may utilize one or more linguistic analysis techniques in analyzing the data described above and understanding the requirements for the one or more physical locations. The one or more linguistic analysis techniques may include, but are not limited to including, a machine learning model with Natural Language Processing (NLP), Latent Dirichlet Allocation (LDA), Hidden markov models (HMM), N-grams, Semantic Textual Similarity (STS), Keyword Extraction, amongst other analysis techniques, such as those implemented in IBM Watson® (IBM Watson and all Watson-based trademarks are trademarks or registered trademarks of International Business Machines Corporation in the United States, and/or other countries), IBM Watson® Natural Language Understanding, IBM Watson® Natural Language Classifier, amongst other implementations. The risk based scheduling module 150 may also receive the requirements for the one or more physical locations and/or other constraints directly from the organization and/or other authorized party through manual input. The risk based scheduling module 150 may utilize the one or more linguistic analysis techniques in generating one or more groupings and/or one or more sub groupings of the plurality of users within an organization based on an analysis of the organizational requirements as well as additional data sources which may be provided by each of the plurality of users. The risk based scheduling module 150 may generate the groupings and/or sub-groupings of users based on at least keywords, classifications, categories, and/or metadata extracted using the one or more linguistic analysis techniques. For example, the risk based scheduling model may utilize STS to identify similar words within the role descriptions of a subset of users. The risk based scheduling module may generate a grouping or sub-grouping based on the similar words within the role descriptions. As will be explained in more detail below, the groupings and/or sub-groupings of users may be presented with unique long-term risk based calendars based on their groupings.

The risk based scheduling module 150 may also utilize the locations of the one or more physical locations of the organization in gathering additional data for uncertain events. Uncertain events may include, but are not limited to including, historical weather events and/or conditions, seasonal infectious disease data, traffic and/or accident data, calendar events data, amongst other data based on at least the locations of each of the one or more physical locations of the organization. For example, the risk based scheduling module 150 may gather historical weather event data such as, but not limited to, snow totals, average sunlight, river and stream levels, flood levels, ice levels, amongst other historical weather event data. The risk based scheduling module 150 may utilize data scraping and/or web scraping methods in gathering additional data with respect to uncertain events. Additionally, the risk based scheduling module 150 may utilize satellite imagery and/or satellite data from publicly available resources and/or existing knowledge bases, such as, but not limited to optical imagery from Landsat (e.g., Landat-8, Landsat-9), Operational Land Imager-2 (OLI-2), Sentinel (e.g., Sentinel-2A, Sentinel-2B Multispectral Instrument (MSI), and/or MODIS. The risk based scheduling module 150 may analyze the satellite imagery and/or satellite data for at least identifying an impact detection of weather events, such as, but not limited to, wildfires, floods, hurricanes, amongst other uncertain weather events. The risk based scheduling module 150 may leverage an empirical impact and/or damage functions to estimate an impact of uncertain weather events.

As will be explained in more detail below at step 204, the risk based scheduling module 150 may utilize the additional data gathered for uncertain events in determining uncertainty quantifications for predictions based on at least time and physical location. The uncertainty quantification may be based on one or more statistical methodologies, such as, but not limited to, frequentists statistics and/or Bayesian methodologies, amongst others. The uncertainty quantifications may be able to predict a full range of uncertain events and/or various impact scenarios, the full range of which may be utilized by the risk based scheduling module 150 in making decisions based on given thresholds which may be learned and/or projected from previously gathered experience stored in the database 130 (e.g., knowledge corpus). These uncertainty quantifications may be incorporated by the risk based scheduling module 150 into the long-term risk based calendar. For example, the risk based scheduling module 150 may gather data such as spatio-temporal weather forecasts and utilize both seasonal and sub seasonal weather forecasts in determining uncertainty quantifications which correspond to a predicted impact on the organization, such as infrastructure and/or supply chain impact, as well as predicted impact on personnel, such as commute time and/or dangers in com-muting.

The risk based scheduling module 150 may store all data received and/or accessed for the organization as well as any additional data gathered in a database 130 (e.g., knowledge corpus). The risk based scheduling module 150 may continuously store more data as it is received and/or gathered in real time. As will be described in more detail below, the risk based scheduling module 150 may utilize similar strategies in gathering data for potential destinations based on desired activities and/or climates of the user.

While the risk based scheduling module 150 may be described below in the context of a business entity and employees, the risk based scheduling module 150 may apply more broadly to other organizations. For example, the risk based scheduling module 150 may help facilitate a professor at a university in creating lesson plans or a syllabus by incorporating event data such that the professor may create lesson plans that enable students to complete lesson plans outside of a physical location during times of the year where seasonal events may be less certain.

The risk based scheduling module 150 may also apply outside of an organizational structure. In this embodiment, one or more users may integrate data sources such as, but not limited to, social media profiles, social media calendars, individual calendars, and/or manual input. The manual input may include data such as, vacation days, events, and/or other obligations. This embodiment may enable the risk based scheduling module 150 to coordinate vacation times, leave, trips, and/or other obligations between multiple individuals outside the workplace. For example, the risk based scheduling module 150 may be utilized by a professional event planner in selecting a date and/or place for an event.

At 204, the risk based scheduling module 150 generates a long-term risk based calendar. The risk based scheduling module 150 may generate the long-term risk based calendar based on at least uncertain events, requirements of the organization, amongst other information derived from the data and/or additional data described at step 202.

The risk based scheduling module 150 may embed uncertainty quantifications into the long-term based calendar by quantifying the probabilities of uncertain events which may be highly localized for each of the one or more physical locations operated by the organization. As will be explained in more detail below with respect to step 208, the risk based scheduling module 150 may utilize threshold levels and/or receive threshold levels from the organization which may be utilized in creating blackout dates and/or high risk dates for which the plurality of users may not take leave and/or vacation.

The long-term risk based calendar generated by the risk based scheduling module 150 may be specific to each of the plurality of users and/or each grouping/sub-grouping of users. The risk based scheduling module 150 may utilize multiple models together in generating the risk based calendar including at least the linguistic analysis techniques and/or statistical methodologies described at step 202. As will be explained in more detail below with respect to at least steps 208 and 210 the risk based scheduling module may utilize additional models in providing recommendations to the user and/or in providing incentives and/or rewards within a gamification system, these additional models may include at least neural networks using prediction algorithms and/or Deep Neural Networks (DNNs) with reinforcement learning capabilities.

The risk scheduling module 150 may integrate unique uncertainty quantifications, different threshold levels, and/or different groupings and/or sub groupings in generating the long-term risk based calendar for each of the plurality of users, such that the long-term risk based calendar may consider the job role, available vacation days, physical location, amongst other information for each user. For example, the long-term risk based calendar may be different for a user at Location A versus Location B and/or different for an Occupation A which requires in-person performance of job duties versus Occupation B which may allow for remote performance of the job role. As will be explained in more detail below with respect to at least step 206 and step 208 the long-term risk based calendar displayed to each user may utilize different visual indications according to the grouping, sub-grouping, and/or uncertainty quantifications applicable to each specific user.

At 206, the risk based scheduling module 150 presents the long-term risk based calendar to a plurality of users associated with the organization. The long-term risk based calendar may be displayed to each of the plurality of users by the risk based scheduling module 150 through at least the UI device set 123 of the peripheral device set 114, the EUD 103, and/or another user interface.

The risk based scheduling module 150 may display the long-term risk based calendar through a user interface in at least an internet browser, dedicated software application, and/or as an integration with a third party software application. For example, the risk based scheduling module 150 may integrate the long-term risk based calendar with existing workforce management software and/or organizational calendars utilized by the organization. The long-term risk based calendar presented to each user may be unique based on at least a grouping, sub-grouping, and/or uncertainty quantifications applicable to each specific user. Additionally, the risk based scheduling module 150 may update each long-term risk based calendar in real time. For example, User A may be in a same grouping as User B due to both User A and User B working at Location A. However, User A may be in Sub-Grouping C while User B may be in Sub-Grouping D based on the linguistic analysis of organizational data provided at step 202. Real time data such as weather forecasting may impact User A's long-term risk based calendar but not User B's long-term risk based calendar because a threshold level exceeded for User A may not impact User B. Accordingly, the risk based scheduling module 150 may utilize unique visual indications on User A's long-term risk based calendar not reflected on User B's. In another example, User A and User B may belong to the same groupings and sub-groupings but the long-term risk based calendar presented to each may be unique due to additional integrated data sources such as, but not limited to, social media profiles, social media calendars, individual calendars, and/or manual input.

At 208, the risk based scheduling module 150 provides one or more recommendations to at least one of the plurality of users. The risk based scheduling module 150 may provide the one or more recommendations to the user using one or more prediction algorithms. The one or more prediction algorithms utilized by the risk based scheduling module 150 may include, but are not limited to including, Random Forest Quantile Regression, amongst other neural networks.

The prediction algorithms may utilize a range of inputs in order to predict an output in the form of a probability distribution. The range of inputs may include at least one or more of organizational requirements, user preferences, and/or game rules/incentives in providing the one or more recommendations to the user. The risk based scheduling module 150 may leverage the determined probabilities in providing the one or more recommendations to the user. The one or more recommendations may include, but are not limited to including, optimal dates for vacation time or leave, destinations meeting user preferences, amongst other recommendations.

Organizational requirements may include at the probability of over-staffing (e.g., P_high(t)) and/or the probability of under-staffing (e.g., P_low(t)) determined using the uncertainty quantifications corresponding to uncertain events in conjunction with the data received at step 202 to predict the probabilities of over-staffing and/or under-staffing.

User preferences may include at least the probability of adequate weather conditions (e.g., P_vac(t)) and/or the probability of other uncertain events for a destination of the user. Each of the plurality of users may create a user profile within the user interface described at step 206. The user profile may be stored in the database 130 (e.g., knowledge corpus), and may include personal preferences, such as, but not limited to, destinations, destination attributes, desired climates, desired activities, budget, family or solo vacations, time frames, amongst other personal preferences. The user may also add one or more recurring dates to the user profile such as birthdays, anniversaries, and/or other specific recurring dates. The user may manually edit the personal preferences for a specific leave and/or vacation and/or save the user preferences for future recommendations. The risk based scheduling module 150 may utilize the user preferences in continuously determining the probabilities for uncertain events such that the risk based scheduling module 150 may notify a user if criteria corresponding to the user preferences may be met. Accordingly, users may develop their own informed risk/reward criteria by leveraging the uncertainty quantifications.

The risk based scheduling module 150 may utilize at least the data scraping and/or web scraping methods as well as the data analysis methods described at steps 202 and 204 in analyzing the one or more recommendations prior to presenting the recommendations to the user. For example, the risk based scheduling module 150 may analyze airline fares, historical flight delays, travel details, amongst other data associated with the recommendations which may be utilized by both the one or more prediction algorithms as well as determining uncertainty quantifications.

The game rules/incentives may be designed by the risk based scheduling module 150 automatically based on the data received and/or gathered at step 202 and/or designed in combination with manual input received by an authorized party of the organization. The organization may offer incentives for users to enter into an agreement for days taken with the lowest probability of uncertain events and/or furthest out in time. Game rules/incentives may include, but are not limited to including, a max number of reward days, advance incentives, consecutive leave day restrictions, probability thresholds, and/or uncertainty quantification thresholds, amongst other game rules/incentives. The incentives offered to a user may be based on reward metrics which may be optimized for both organizational requirements and/or performance and user satisfaction based on experience from feedback received using reinforcement learning techniques such as Deep reinforcement learning (deep RL) and/or Deep Neural Networks (DNNs). For example, the risk based scheduling module 150 may utilize the uncertainty quantifications and/or threshold levels described at step 204 in combination with the organizational requirement probabilities and/or user preference probabilities in creating blackout dates and/or high risk dates which may be coupled with distribution based incentives for user's not to take time off on those dates.

The risk based scheduling module 150 may utilize colors amongst other visual indications within the long-term risked based calendar in providing the one or more recommendations to the user. The risk based scheduling module 150 may also gamify the long-term risk based calendar with a game board. The game board may describe preferred days based on uncertain events and/or uncertainty quantifications which may be updated dynamically based on member subscriptions, requests and vacation allocation. The game board may also include rewards for specific days which may be updated on the board and monitored to aid in organizational understanding of the impact of game rules/incentives on leave and/or vacation. In this embodiment, the risk based scheduling module 150 may monitor leave and/or vacation taken by the plurality of users in conjunction with the game rules/incentives such that the organization may adjust the game rules/incentives to enhance the selection of low probability times. The gamification of the long-term risk based calendar may also include an open marketplace of vacation days and/or time off between the plurality of users and/or a subset of the plurality of users. The open marketplace may require organizational approval, additional oversight, as well as additional game rules, prior to being administered by the risk based scheduling module 150.

In an embodiment, the risk based scheduling module 150 may coordinate recommendations between two or more users. In this embodiment, the risk based scheduling module 150 may integrate the long-term risk based calendars of two or more users such that the one or more recommendations may reflect multiple organizational requirements, job roles, and/or user preferences.

At 210, the risk based scheduling module 150 receives feedback. The risk based scheduling module 150 may receive feedback from the plurality of users, the organization, and/or additional data gathered from the one or more physical locations.

The feedback may be received from the plurality of users and/or the organization in the user interface. The additional gathered may be received from one or more publicly available resources and/or one or more IoT devices associated with each of the one or more physical locations. The feedback may be stored in database 130 (e.g., knowledge corpus) and utilized to improve at least the one or more recommendations, the probabilities associated with organizational requirements or user preferences, the game rules/incentives, and/or the uncertainty quantifications for uncertain events. For example, the incentives and/or rewards offered to a user may be based on reward metrics which may be optimized for both organizational requirements and/or performance and user satisfaction based on experience from feedback received using reinforcement learning techniques such as deep RL and/or DNNs, amongst other reinforcement learning techniques.

It may be appreciated that FIG. 2 provides only an illustration of one embodiment and do not imply any limitations with regard to how different embodiments may be implemented. Many modifications to the depicted embodiment(s) may be made based on design and implementation requirements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for integrating uncertainty quantifications into a risk based calendar, the method comprising:

analyzing, using one or more linguistic analysis techniques, data received for an organization, wherein the one or more linguistic analysis techniques are utilized in understanding requirements for each of one or more locations of the organization;

generating a risk based calendar using the data received for the organization, wherein the risk based calendar is embedded with one or more uncertainty quantifications based on quantified probabilities of uncertain events and a corresponding impact on each of the one or more locations of the organization;

presenting the risk based calendar to a plurality of users associated with the organization, wherein the risk based calendar includes incentive offers to a user generated by a Deep Neural Network based on the requirements for each of the one or more locations of the organization, wherein the risk based calendar is presented with a game board, and wherein the Deep Neural Network is retrained based on the incentive offers selected by users to improve a selection of low probability times of the uncertain events; and providing one or more recommendations to at least one of the plurality of users, wherein the one or more recommendations are provided using one or more prediction algorithms, wherein the one or more prediction algorithms utilizes at least one or more of, organizational requirements, user preferences, or games rules in providing the one or more recommendations, and wherein the one or more prediction algorithms includes Random Forest Quantile Regression.

2. The method of claim 1, further comprising:

receiving feedback from at least one or more of, the organization, the plurality of users, or one or more IoT devices associated with a physical location corresponding to each of the one or more locations of the organization; and storing the feedback in a database.

3. The method of claim 1, wherein the risk based calendar is specific to each of the plurality of users, and wherein the risk based calendar is updated in real time.

4. The method of claim 1, wherein the analyzing of the data received for the organization further comprises:

generating one or more groupings and sub-groupings for each of the plurality of users associated with the organization; and providing the one or more recommendations to two or more users at once to coordinate time off between the two or more users based on the one or more groupings and sub-groupings of the two or more users and the requirements for each of the one or more locations of the organization.

5. The method of claim 1, wherein the risk based calendar includes at least one or more blackout dates and at least one or more high risk dates, wherein the one or more blackout dates and the one or more high risk dates exceed a risk threshold level, and wherein leave requests are disabled from the one or more blackout dates and the one or more high risk dates.

6. The method of claim 1, wherein the organizational requirements include determining at least a probability of over-staffing and a probability of under-staffing.

7. The method of claim 1, wherein the one or more recommendations provided include at least a list of potential destinations based on desired activities and climates designated by the at least one user within a user profile, wherein each of the potential destinations include an associated list of dates determined by one or more prediction algorithms, wherein the one or more prediction algorithms utilize at least a user role, a physical location of the organization, and the requirements of the organization as input.

8. The method of claim 7, wherein at least one of the one or more uncertainty quantifications includes weather, wherein the quantified probabilities of the uncertain events associated with the weather are determined based on spatio-temporal weather forecasts which utilize both seasonal and sub-seasonal forecasts for the physical location of the organization associated with the user.

9. A computer system for integrating uncertainty quantifications into a risk based calendar, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

analyzing, using one or more linguistic analysis techniques, data received for an organization, wherein the one or more linguistic analysis techniques are utilized in understanding requirements for each of one or more locations of the organization;

generating a risk based calendar using the data received for the organization, wherein the risk based calendar is embedded with one or more uncertainty quantifications based on quantified probabilities of uncertain events and a corresponding impact on each of the one or more locations of the organization;

presenting the risk based calendar to a plurality of users associated with the organization, wherein the risk based calendar includes incentive offers to a user generated by a Deep Neural Network based on the requirements for each of the one or more locations of the organization, wherein the risk based calendar is presented with a game board, and wherein the Deep Neural Network is retrained based on the incentive offers selected by users to improve a selection of low probability times of the uncertain events; and providing one or more recommendations to at least one of the plurality of users, wherein the one or more recommendations are provided using one or more prediction algorithms, wherein the one or more prediction algorithms utilizes at least one or more of, organizational requirements, user preferences, or games rules in providing the one or more recommendations, and wherein the one or more prediction algorithms includes Random Forest Quantile Regression.

10. The computer system of claim 9, further comprising:

receiving feedback from at least one or more of, the organization, the plurality of users, or one or more IoT devices associated with a physical location corresponding to each of the one or more locations of the organization; and storing the feedback in a database.

11. The computer system of claim 9, wherein the risk based calendar is specific to each of the plurality of users, and wherein the risk based calendar is updated in real time.

12. A computer program product for integrating uncertainty quantifications into a risk based calendar, comprising:

one or more non-transitory computer-readable storage media and program instructions stored on at least one of the one or more tangible storage media, the program instructions executable by a processor to cause the processor to perform a method comprising:

analyzing, using one or more linguistic analysis techniques, data received for an organization, wherein the one or more linguistic analysis techniques are utilized in understanding requirements for each of one or more locations of the organization;

generating a risk based calendar using the data received for the organization, wherein the risk based calendar is embedded with one or more uncertainty quantifications based on quantified probabilities of uncertain events and a corresponding impact on each of the one or more locations of the organization;

presenting the risk based calendar to a plurality of users associated with the organization, wherein the risk based calendar includes incentive offers to a user generated by a Deep Neural Network based on the requirements for each of the one or more locations of the organization, wherein the risk based calendar is presented with a game board, and wherein the Deep Neural Network is retrained based on the incentive offers selected by users to improve a selection of low probability times of the uncertain events; and providing one or more recommendations to at least one of the plurality of users, wherein the one or more recommendations are provided using one or more prediction algorithms, wherein the one or more prediction algorithms utilizes at least one or more of, organizational requirements, user preferences, or games rules in providing the one or more recommendations, and wherein the one or more prediction algorithms includes Random Forest Quantile Regression.

13. The computer program product of claim 12, further comprising:

receiving feedback from at least one or more of, the organization, the plurality of users, or one or more IoT devices associated with a physical location corresponding to each of the one or more locations of the organization; and storing the feedback in a database.

14. The computer program product of claim 12, wherein the risk based calendar is specific to each of the plurality of users, and wherein the risk based calendar is updated in real time.

\* \* \* \* \*